Patented Dec. 29, 1931

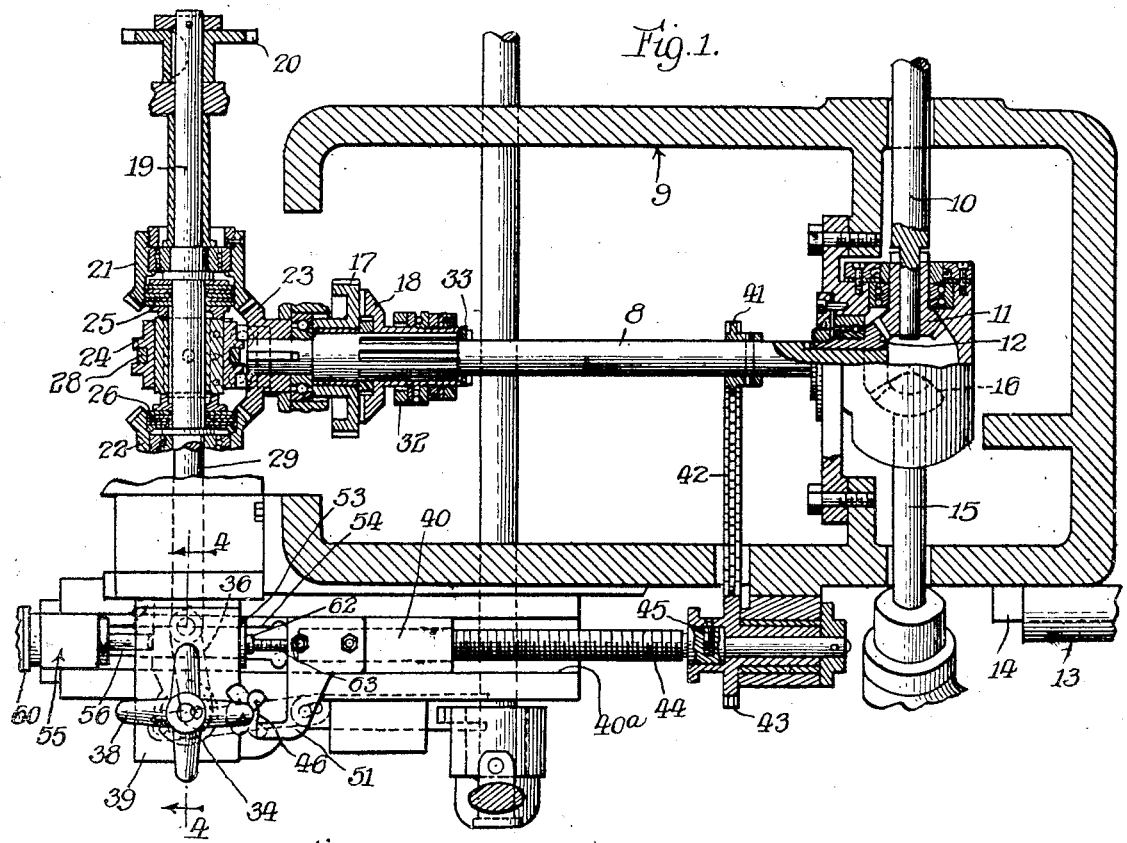

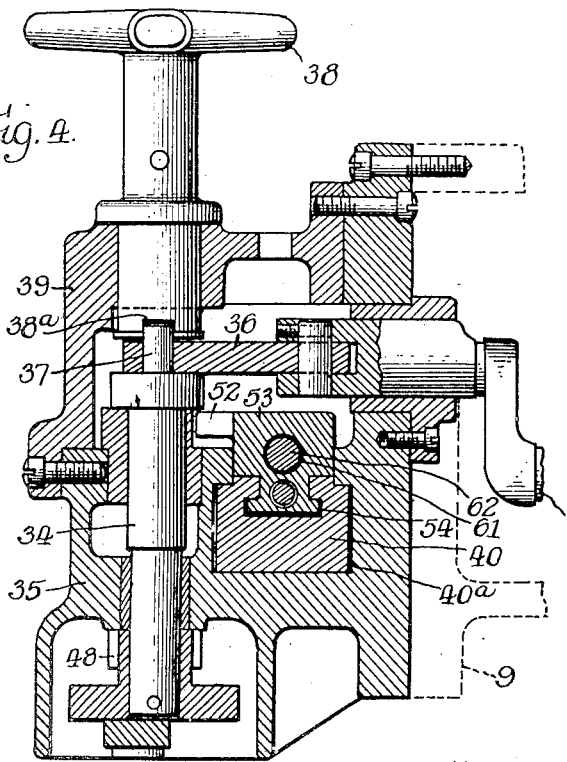
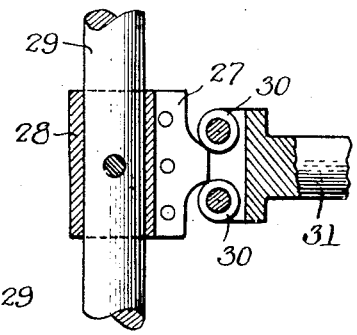
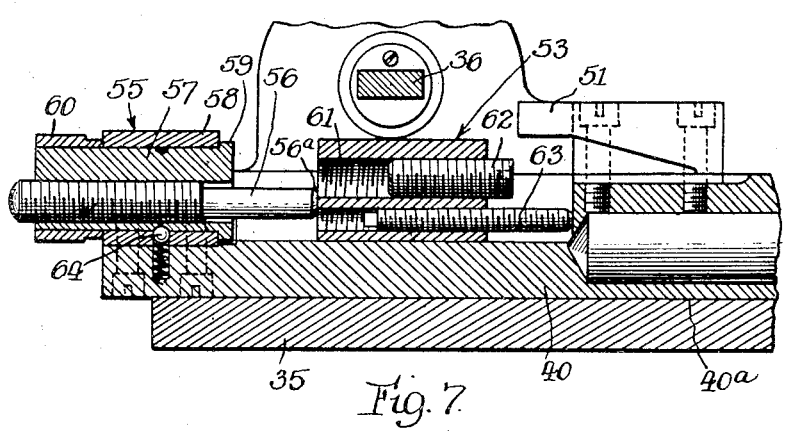
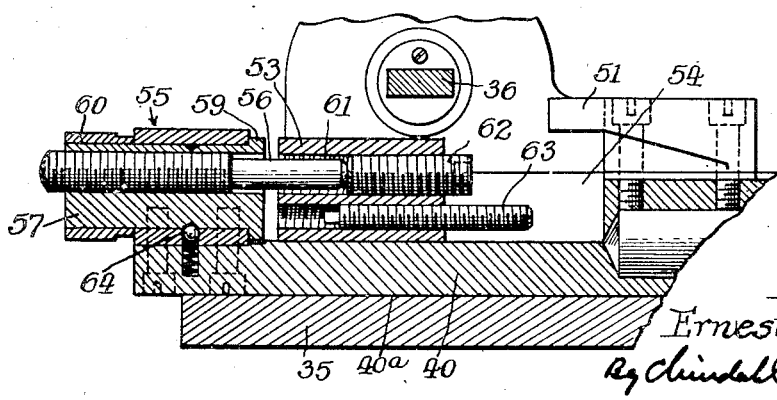

1,838,119

UNITED STATES PATENT OFFICE

ERNEST J. SVENSON, OF ROCKFORD, ILLINOIS, ASSIGNOR TO SUNDSTRAND MACHINE TOOL COMPANY, OF ROCKFORD, ILLINOIS, A CORPORATION OF ILLINOIS

MACHINE TOOL

Application filed June 3, 1929. Serial No. 367,939.

The invention relates generally to machine tools and more particularly to an improved control mechanism for the machanism that actuates the tool support or the work support.

The primary object of the invention is to provide a new and improved actuating dog for a machine tool control mechanism mounted for movement in timed relation to a movable support and arranged to permit the dog to be moved by an easily performed manual operation from an adjusted operating position and back into said position without disturbing the adjustment of the dog, thus enabling the operator to disable the dog at will so that the control mechanism may be operated without affecting the change in speed or direction of movement for which the particular dog is intended.

Another object is to provide a new and improved dog construction for shifting a clutch through which a movable support is driven so as to change the rate or direction of movement of the support at a predetermined point in an operating cycle, said dog construction embodying adjustable means for maintaining the dog in a first or normal position in which it is operative to shift the clutch when the support is at said predetermined point and being arranged to permit of movement of the dog from said first position to a second position without disturbing said adjustable means, in which second position the dog is operable to effect the clutch-shifting operation at a different point in the cycle of movement of the support.

A machine tool support is usually actuated through a definite cycle of movements in which a rapid approach movement is followed by movement through the operating stroke at a comparatively slow feeding speed, the change from one speed to the other being governed by the setting of a trip dog usually known as the feed dog which actuates one or more clutches.

A more specific object of the invention is to reduce materially the time required for setting up the tool by providing a new and improved feed dog construction arranged so that the dog may be adjusted to shift the clutch at the desired point and may then be disabled without destroying its adjustment so that the support may be moved to the end of its normal feeding stroke at rapid traverse speed for the purpose of adjusting the tools to a templet carried by the work support.

Machine tools are often provided with a traverse shaft which may be driven while the feed shaft is inoperative and when this condition obtains, the operation of the usual feed dog disengages the traverse and engages the support actuating mechanism with the motionless feed shaft, thus stopping the support.

Another object of the invention is to provide an improved feed dog construction for use with such a machine tool arranged to permit manual movement of the dog from its usual adjusted position to a second operative position without disturbing the adjustment of its first position, together with adjustable means for determining the second position so that the dog will act to stop the support at the end of its usual feeding stroke.

Other objects and advantages will become apparent from the following detailed description taken in connection with the accompanying drawings, in which:

Figure 1 is a fragmental horizontal sectional view taken through the bed of a lathe embodying the preferred form of the invention.

Fig. 2 is an enlarged fragmental plan view of the control mechanism shown in Fig. 1 with parts broken away to show the feed dog.

Fig. 3 is a diagrammatic view similar to Fig. 2 showing the positions of the control elements during rapid return movement of the supports and just prior to the operation of the stop dog.

Fig. 4 is a vertical sectional view taken along the line 4—4 of Fig. 1.

Fig. 5 is a detail view of the clutch interlock.

Figs. 6 and 7 are vertical sectional views taken along the line 6—6 of Fig. 2 showing the stop dog in two different positions of adjustment.

For purposes of disclosure the preferred form of the invention is illustrated in the drawings and will hereinafter be described in detail as applied to the particular form of lathe disclosed and claimed in my copending application Serial No. 245,168, filed January 7, 1928, but it is to be understood that this disclosure is not intended as a limitation of the invention to this type of machine tool, it being contemplated that various changes might be made by those skilled in the art to adapt the invention to other types of machines without departing from the spirit and scope of the invention as defined by the appended claims.

The invention as herein disclosed is embodied in the control mechanism of a lathe such as that shown in my hereinbefore mentioned copending application Serial No. 245,168 and when so used serves to facilitate and reduce the time necessary for accurately setting up the machine to provide a given cycle of support movement. A portion of the actuating mechanism of such a lathe is illustrated herein in Fig. 1 and comprises a feed shaft 8 rotatably mounted longitudinally of the bed or base frame 9 and arranged to drive a rear tool support of the lathe (not shown) by means including a rearwardly extending shaft 10 having a bevel gear 11 thereon engaging a bevel gear 12 positioned on the feed shaft 8. A front carriage 13 sliable longitudinally of the bed 9 on ways 14 is also driven from the feed shaft 8 by means including a forwardly and downwardly extending shaft 15 having a bevel gear 16 thereon engaging the bevel gear 12 on the feed shaft 8.

As illustrated in said application, the feed shaft 8 may be driven at feed speeds through a gear train connected to the lathe spindle (not shown) and including a pinion 17 (Fig. 1) rotatably mounted on the feed shaft 8. The rotative movement of the pinion 17 is communicated to the feed shaft 8 by means of a clutch element 18 slidably splined on the feed shaft 8 and engageable with suitable clutch teeth formed on the adjacent side of the pinion 17.

The feed shaft 8 is driven at traverse speeds in either direction by means including a shaft 19 mounted in the frame 9 at right angles to the feed shaft 8 and adjacent the end thereof, the shaft 19 being driven from the main pulley (not shown) of the lathe independently of the spindle by means including a sprocket 20 mounted on the shaft 19 exteriorly of the lathe frame. A pair of opposed bevel gears 21 and 22 are rotatably mounted on the shaft 19 and engage opposite sides of a companion bevel gear 23 which is keyed on the adjacent end of the feed shaft 8.

A shiftable double-faced clutch member 24 is positioned intermediate opposing clutch faces 25 (rapid approach) and 26 (rapid return) mounted on the bevel gears 21 and 22 respectively, the clutch member 24 being splined to the shaft 19 so that upon engagement of the shiftable clutch member 24 with one or the other of the clutch members 25 and 26, the feed shaft 8 is driven in reverse directions at traverse speeds.

The shiftable feed clutch member 18 and the traverse clutch member 24 are preferably interlocked to prevent simultaneous engagement. An exemplary form of interlock is shown in Fig. 5 comprising a projecting cam member 27 pinned to a clutch shifting yoke 28 for the traverse clutch, which yoke is mounted on a control rod 29 positioned beneath the traverse shaft 19.

A pair of spaced rollers 30 are carried on the forward end of a feed clutch rod 31 connected by means of a yoke 32 to the movable feed clutch element 18. A spring 33 normally urges the feed clutch member 18 into engagement with the opposed clutch member and this movement serves to hold the rollers 30 in engagement with the cam member 27. When the traverse clutch rod 29 is in the positon shown in Fig. 5, the clutch member 24 is in neutral position, and the feed clutch 18 is engaged. When the traverse clutch rod 29 is moved in either direction from the position shown in Fig. 5 so as to engage one of the traverse clutches the cam 27 and rollers will disengage the feed clutch.

The control rod 29 is arranged for actuation by means including a shaft 34 (Figs. 1, 2 and 4) mounted for rotation about a vertical axis in a bracket 35 on the forward side of the machine frame, the shaft 34 being connected to the control rod 29 by means of a link 36 pivoted at one end to the rod 29 and at the other end to a crank pin 37 on the shaft 34.

When the shaft 34 is in the position shown in Fig. 1 or in a position 180° removed therefrom, the traverse clutch member 24 will be in neutral position and the feed clutch 18 will be engaged. When the shaft 34 is rotated to the position shown in Fig. 2, the rapid approach clutch 25 will be engaged and the feed shaft 8 will be rotated at rapid traverse speed. Rotation of the shaft 34 to a position 180° removed from the position shown in Fig. 2 to the position shown in Fig. 3 will engage the rapid return clutch 26 to rotate the feed shaft 8 at rapid traverse speed in a reverse direction.

A manual operating handle 38 (Figs. 1 and 4) for the shaft 34 is rotatably mounted in a bracket 39 and has a socket 38ª to receive the crank pin 37.

The shaft 34 may be automatically actuated to impart a series or cycle of movements to the supports by control means including a control element in the form of a slide 40, which slide is mounted in an inverted T-slot 40ª in the bracket 35 for movement along the front wall of the lathe frame 9 transversely of the shaft 34. The slide 40 is driven directly from the feed shaft 8 by means of a sprocket 41 Fig. 1) on the feed shaft. The sprocket 41 is connected by means of a chain 42 to a sprocket 43 rotatably positioned on the forward side of the machine frame 9, and this sprocket 43 is arranged to rotate a screw 44 which is in threaded engagement with the slide 40. To permit of adjustment of the slide 40 relatively to the feed shaft 8 a releasable driving connection 45 is provided between the sprocket 43 and the screw 44. Thus when the feed shaft 8 is rotated in opposite directions to produce the desired movements of the tool supports the slide 40 will be moved back and forth in timed relation to the rotation of the feed shaft 8.

The driving connection between the slide 40 and the feed shaft 8 is arranged in the present instance so that when the supports are moved toward the work the slide 40 is moved to the right as shown in Figs. 1 to 3 and when the supports are retracted from the work the slide is moved to the left.

During the movement of the slide 40 back and forth it is arranged automatically to turn the shaft 34 and hence shift the feed and traverse clutches so as to initiate or control different movements of the supports. This is accomplished through the medium of a trip member 46 mounted in the bracket 35 adjacent to the shaft 34 for rotation about a vertical axis. The trip member 46 is provided with a pinion 47 which engages a similar pinion 48 attached to the shaft 34. Preferably the pinion 48 is one-half the diameter of the pinion 47 so that during one revolution of the trip member 46 the shaft 34 will make two revolutions.

The trip member 46 is provided with a pair of diametrically opposed abutments 49 and a second pair of diametrically opposed abutments or pins 50. As illustrated herein, a stop dog 51 is fixed on the slide 40 so as to engage the outer one of the pins 50 when the slide is moved to the left. The abutments 49 are positioned in a lower horizontal plane than the pins 50 and are arranged so that the inner one may be engaged by a tooth or lug 52 formed on a feed dog 53. This engagement takes place when the slide is moved to the right as shown in Fig. 2.

As above pointed out, the stop dog 51 is operable only when the slide 40 is moving to the left. Such movement is obtained through engagement of the rapid return clutch 26, which engagement positions the shaft 34 and the trip element 46 as shown in Fig. 3. As the dog 51 moves to the left it engages the outer pin 50 and moves the trip element 46 through one-eighth of a revolution in a clockwise direction from the position shown in Fig. 3 to the position shown in Fig. 1, thus disengaging the clutch 26. During the rapid return movement of the supports, the feed pinion 17 is motionless so that the disengagement of the clutch 26 by the stop dog 51 stops the movement of the feed shaft.

The gearing between the trip member 46 and the shaft 34 is arranged so that whenever the rapid approach clutch 25 is engaged, one of the abutments 49 will be positioned in the path of the lug 52 on the feed dog 53 as shown in Fig. 2. As the lug 52 moves to the right, from the position shown in Fig. 2, the stop dog 51 will be also moved from the position shown in Fig. 2 so as to release the trip member 46 for rotation. The lug 52 of the feed dog will then engage the abutment 49 and thus disengage the rapid approach clutch 25 and permit engagement of the feed clutch 18 by the spring 33. If the feed pinion 17 is then rotating, the feed shaft 8 will be rotated slowly so as to impart advancing movement to the supports at feeding speed.

In order to reduce the time required for the completion of an operating cycle of the lathe, the feed dog 53 is adjusted so that the tools carried by the supports approach very close to the work before their movement is changed to feeding speed.

This adjustment is therefore made with considerable care and workmen are reluctant to disturb the adjustment even though it is sometimes desirable to do away with the automatic shifting from rapid approach to feeding speed. Such an occasion arises when a new set of tools is mounted on the supports and the workman wishes to adjust these tools to a templet positioned between the work-supporting centers. This is done when the tool supports are at the end of their feeding movements and it will be seen that in order to so position them, they must run through their normal feeding stroke at feed speed due to the automatic shifting by the feed dog 53.

To permit the feed dog 53 to be readily and easily moved from its normal accurately adjusted operative position to avoid automatic shifting from rapid aproach to feed, the dog 53 is mounted on the slide 40 for movement relatively to the slide and is guided in such movement by an inverted T-slot 54 formed in the slide, in which T-slot the dog 53 is slidably engaged. The T-slot 54 preferably extends parallel to the path of movement of the slide 40.

The trip dog 53 is maintained and rendered effective in any desired position along its path on said slide by means preferably comprising a stop device designated generally as 55. This device includes a rod 56 positioned substantially parallel to the T-slot 54 so that the end 56ª of the rod forms an abutment adapted to engage an opposing abutment formed by the adjacent end of the dog 53 so as to prevent movement of the dog to the left in the T-slot 54. The rod 56 is preferably mounted eccentrically in a sleeve 57 (Figs. 6 and 7) which forms a part of the stop device 55 and is rotatably mounted in a bracket 58 secured in position on the slide 40, the axis of the sleeve 57 and the rod 56 being parallel to each other and parallel to the path of movement of the slide. The sleeve 57 is held in fixed longitudinal position within the bracket 58 by means of a collar 59 engaging one side of the bracket and a head 60 on the other end of the sleeve engaging the other side of said bracket.

By rotation of the sleeve 57 through 180° from the position in which it is shown in Fig. 6 the rod 56 may be moved transversely of the path of movement of the dog 53 to a positon above the rotative axis of the sleeve in which position the rod 56 does not engage the end of the dog 53 and the dog may be moved to the left from the position in which it is shown in Fig. 6 to the position shown in Fig. 7. During such movement the rod 56 telescopes into a longitudinally extending bore 61 formed in the dog 53. The bore 61 is preferably screw threaded to receive a similarly threaded plug 62 which may be adjusted longitudinally of the bore so as to form an adjustable abutment on the dog 53 arranged to engage the abutment formed by the projecting end 56ª of the rod 56. Thus the movement of the dog 53 to the left may be limited by adjustment of the plug 62.

The rod 56 is also arranged for longitudinal adjustment by means of screw threaded engagement with the sleeve 57 so that by adjustment of the rod 56, the right hand or normal operative position of the dog 53 may be determined. After this position has been adjusted the plug 62 may be adjusted longitudinally of the dog 53 so as to definitely determine the second or left hand position of the dog.

In the present embodiment another rod 63 is mounted in the dog 53 so as to project therefrom to the right and this rod 63 is provided with screw threaded engagement with the dog 53 so as to permit longitudinal adjustment of the rod. Thus when the rod 56 is in engagement with the fixed abutment of the dog 53 (Fig. 6) the second rod 63 may be adjusted so that its right end engages the abutment formed by the end of the T-slot 54 thus fixing the dog 53 against movement in either direction relatively to the slide 40.

When it is desired to move the dog from its adjusted right hand or normal position, (Fig. 6) it is only necessary for the operator to grasp the handle 60 and turn the sleeve 57 180° from the position shown in Fig. 6 to the position shown in Fig. 7 so as to permit the dog to be moved to its second or left hand position which is determined by engagement of the two adjustable abutments formed by the rod 56 and the plug 62. A spring-pressed ball 64 is preferably mounted in the stop device to engage suitable notches in the sleeve 57 to maintain the sleeve in the position in which it is placed by the operator.

When the operator desires to move the tool supports rapidly to the end of their forward stroke for the purpose of adjusting the tools, the stop device 55 is moved as above described so as to permit movement of the feed dog 53 to the left hand position determined by engagement of the rod 56 and the plug 62. The rapid approach clutch 25 is then engaged by means of the operating handle 38 so as to cause rapid rotation of the feed shaft 8 with the resultant movement of the supports. Since the feed pinion 17 is motionless, disengagement of the clutch 25 will serve to stop the movement of the shaft 8 and the supports. Thus the plug 62 may be adjusted on the dog 53 so that in its second or left-hand position, the dog will serve to stop the movement of the supports automatically at the end of the normal feeding stroke.

After the tools have been adjusted and it is desired to have the supports travel through their normal operating cycle, the rapid return clutch 26 is engaged by means of the manual operating handle 38 and the slidable control element 40 is moved in an opposite direction (to the left) until the stop dog 51 engages one of the rollers 50 of the trip device and the clutch 26 is disengaged so as to stop movement of the supports. The feed dog 53 may then be returned to its normal position and by simply moving the stop device 55 through 180° the rod 56 may be engaged with the end of the dog so as to maintain it in its normal operative position.

From the foregoing it will be apparent that the invention provides a new and improved dog construction which may be applied with advantage to many types of machine tools so as to reduce materially the time required for setting up the machine for a new operating cycle.

It will also be apparent that this dog construction makes it possible to quickly adjust a new set of tools in a machine tool without disturbing the accurate adjustments previously made in the control mechanism.

I claim as my invention:

1. In a machine tool having a reciprocatory support and means for reciprocating said support including a reversible feed shaft, mechanism for rotating said shaft in one direction at traverse and feed speeds, control means for said mechanism comprising an element driven by said shaft, a trip device positioned adjacent said element, a trip dog mounted on said element for sliding movement thereon, means for adjusting said dog to a first operative position on said element wherein the dog is effective to actuate said trip device to change the speed of said element from traverse to feed, said means being movable to permit movement of the dog along said path of movement of said element to a second operative position, and adjustable means for determining said second position.

2. In a machine tool having a reciprocatory support, mechanism for moving said support in one direction at traverse and feed speeds, means for controlling said mechanism including a trip device, the combination of means for actuating said trip device to change the speed of said support from traverse to feed comprising an element moveably mounted adjacent said trip device, a trip dog mounted on said element for sliding movement parallel to the path of said element, and a member for determining the position of said dog, said member being mounted on said element for movement transversely of said path to vary the effective position of said dog.

3. In a machine tool having a reciprocatory support, mechanism for moving said support in one direction at traverse and feed speeds including a feed shaft, control means for said mechanism comprising a movably mounted element driven from said feed shaft, a trip device positioned adjacent said element, a trip dog mounted on said element for sliding movement parallel to the path of said element, and a member for determining the effective position of said dog on said element, said member being mounted on said element for movement transversely of said path to determine the effective position of said dog, and means carried by said member for adjusting said effective position of the dog.

4. In a machine tool having in combination, a movably mounted support, a feed shaft, an element movable in timed relation to said feed shaft, actuating mechanism for said shaft and control mechanism therefor, a trip dog for operating said control mechanism, said dog being mounted on said element for sliding movement parallel to said element movement, and a stop device mounted on said element to determine the position of said dog thereon, said device being movable relatively to said element to engage said dog at different points to vary the operative position of said dog.

5. In a machine tool, the combination of a movably mounted support, means for moving said support including a feed shaft, an element movable in timed relation to said feed shaft, actuating mechanism for said shaft and control mechanism therefor including a trip device mounted adjacent said element, a trip dog mounted on said element for sliding movement relatively thereto, a first abutment on said dog adjustable parallel to the line of movement of said element, and a stop device for determining the effective position of said dog, said device being mounted on said element for movement transversely thereof and carrying a second adjustable abutment arranged when said device is in one position to engage said first adjustable abutment to maintain said dog in one position on said element and when the device is in another position to engage said dog to maintain said dog in another position on said element.

6. In a machine tool having a movable support, a feed shaft, an element movable in timed relation thereto, actuating mechanism for said shaft, and control means for said mechanism, the combination of a dog slidable along a definite path on said element and operable at any point along said path to actuate said control means, said dog having a plurality of abutments formed thereon spaced longitudinally of said path, and a stop device rotatably mounted on said element and movable to engage different abutments on said dog to determine the effective position of said dog.

7. In a machine tool having a movable support, a driven feed member, an element movable in timed relation thereto, actuating mechanism for said member, and control means for said mechanism, the combination of a dog slidable along a definite path on said element and operable when fixed at any point along said path to actuate said control means, said dog having a plurality of abutments formed thereon spaced longitudinally of said path, and a stop device mounted on said element for rotation about an axis parallel to said path, a member mounted on said device eccentrically of its axis of rotation and adjustable parallel to said axis, said member being arranged to engage different abutments on said dog when said stop device is rotated to different positions so as to render the dog effective in different positions along said path.

8. In a machine tool having a movable support, actuating mechanism for said support, and dog-actuated mechanism for controlling said actuating mechanism, the combination of a dog for actuating said control mechanism and mounted so as to permit movement of the dog away from an adjusted operating position and back into said position without disturbing its adjustment.

9. The combination with a movable machine tool element, actuating mechanism for said element and dog operated control means for said mechanism, of a dog member mounted for sliding movement along a definite path, a stop member mounted to move with said dog, means forming an abutment on each one of said members arranged to provide for adjustment of said abutments relatively to the members and longitudinally of said path, means forming another abutment on one of said members in fixed position on said member longitudinally of said path, the abutment-forming means on one of said members being manually movable in a plane perpendicular to said path to permit engagement of the two adjustable abutments or the longitudinally fixed abutment with the adjustable abutment on the other member whereby to provide two adjustable positions for said dog member on said element between which positions the dog may be manually moved.

10. The combination with a movable element of a machine tool, actuating mechanism for said element and dog operated control means for said mechanism, of a dog mounted for sliding movement and driven by said mechanism, a stop device movable with said dog and mounted for rotation about an axis substantially parallel to the path of sliding movement of said dog, a rod mounted in said device for adjustment along said axis and having one end projecting therefrom toward said dog, a bore formed in said dog into which said rod may pass when in one position to permit movement of the dog toward said device, an adjustable plug in said bore to engage the end of said rod and limit such movement of said dog, said dog being arranged to abut another part of said dog when said device is in another rotative position to hold said dog at a greater distance from said device, and an adjustable member on the dog to limit movement of the dog away from the device.

11. A trip device comprising a supporting element, a dog mounted on said element for sliding movement relatively thereto, a stop device mounted on said element for rotation about an axis substantially parallel to the path of sliding movement of said dog, a rod mounted in said device for adjustment along said axis and having one end projecting therefrom toward said dog, a bore formed in said dog into which said rod may pass when in one position to permit movement of the dog toward said device, and an adjustable plug in said bore to engage the end of said rod and limit such movement of said dog, said rod being arranged to abut another part of said dog when said device is in another rotative position to hold said dog at a greater distance from said device.

In testimony whereof, I have hereunto affixed my signature.

ERNEST J. SVENSON.